– – –

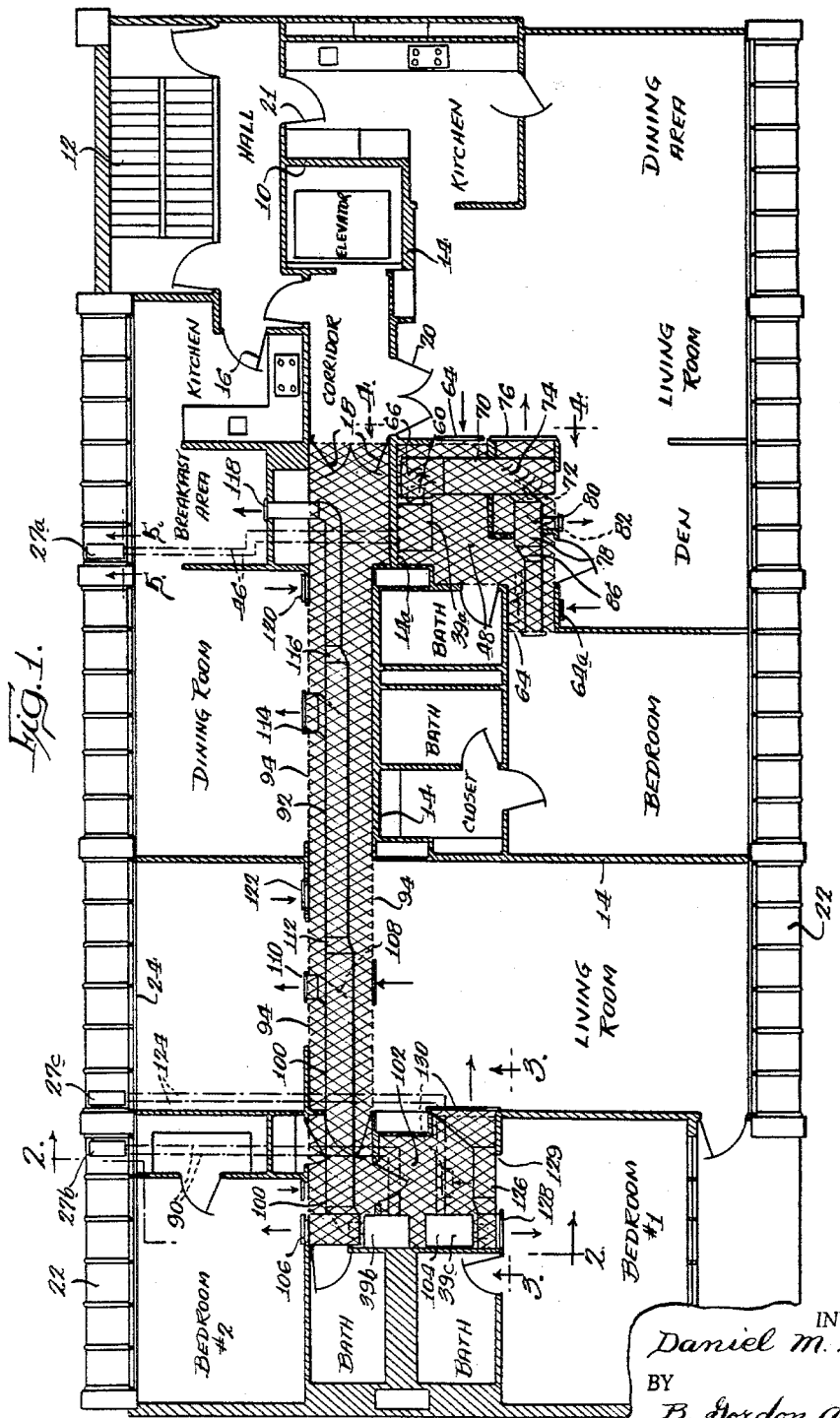

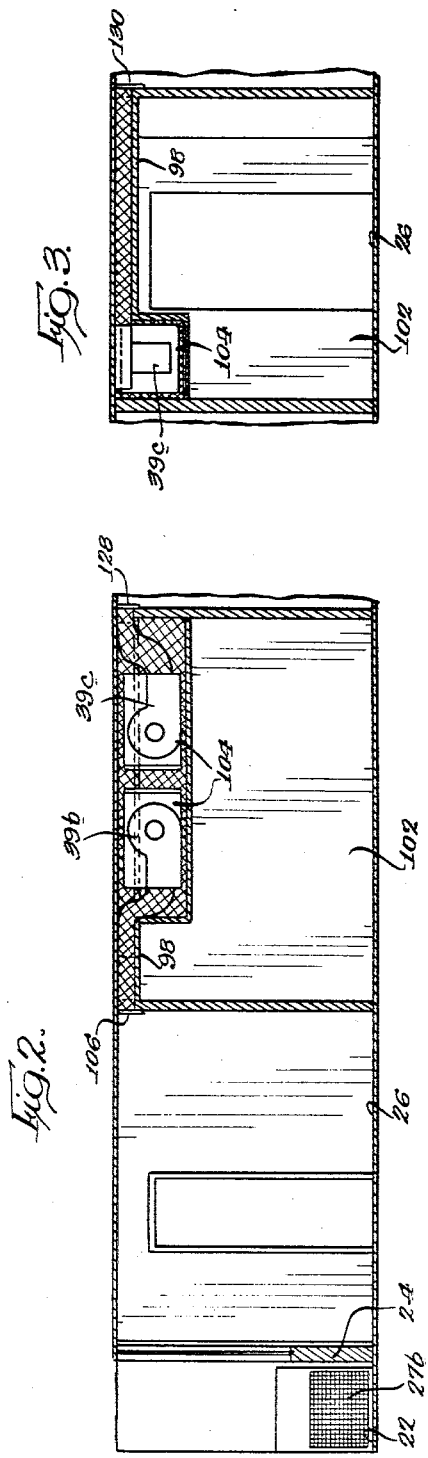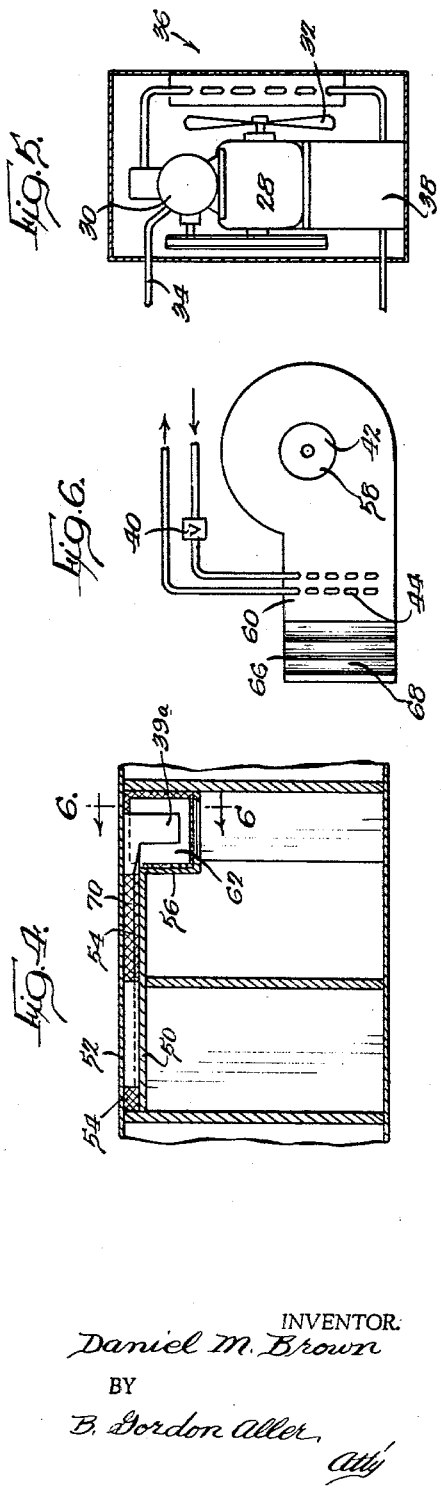

United States Patent Office 3,169,382
Patented Feb. 16, 1965

3,169,382
AIR CONDITIONING SYSTEM FOR MULTIPLE UNIT DWELLINGS
Daniel M. Brown, Evanston, Ill., assignor to Systems Engineering Corporation, Chicago, Ill., a corporation of Illinois
Filed May 2, 1963, Ser. No. 277,547
2 Claims. (Cl. 62—259)

My invention relates to an individualized air conditioning system for multiple unit dwellings.

In the apartment buildings being constructed today, particularly those of the high rise or multi-unit type, individualized electric resistance radiant heating has been found highly desirable. It saves greatly on cost of construction. It is inherently less expensive than a conventional circulating system, both in respect to the cost of components and the cost of installation. Moreover, such an electrical heating system provides complete flexibility for the tenant. The apartments are all independent of one another, and each room of the apartment may be maintained at a desired temperature independent of the other rooms.

One objection, however, to the replacement of the central heating system is that such central systems have also been used as cooling or air conditioning systems, and the individualization of the heating plant therefore requires either a separate, central air conditioning system or the use of a multitude of window air conditioners.

The central air conditioning system is exceedingly expensive, requiring an elaborate and expensive plant, a heat exchanger of great capacity and a quantity of duct work. The window type air conditioners are noisy, expensive to operate, unsightly, and uncertain in operation with a short life and a need for frequent repair. Moreover, the efficiency is low, resulting in little cooling for the power consumed.

My invention has for a primary object the provision of an air conditioned, multiple unit dwelling structure wherein both the very expensive central system and the nearly equally expensive and generally unsatisfactory window units are avoided. More narrowly my invention provides for an air conditioning system for a multiple unit dwelling such as an apartment building on an individual apartment basis wherein the great cost and maintenance problem of the central system to the building owner is minimized and at the same time, the various faults of the window type air conditioners are avoided. There are no unsightly objects in the windows. The noise of operation is no greater than that of a central system.

The system I contemplate accommodates a sufficient cubic volume of interior space so as to permit a relatively large, and therefore efficient, heat exchange system and motor size.

Another object of my invention is to provide an emplaced air conditioning system having the following advantages. The condenser unit is situated outside the dwelling thereby avoiding noise, heat of operation, smells, etc. Inside I provide one or more evaporators connected to the condenser unit which is in heat exchange relation with the air in the building or dwelling unit by a system of concealed duct work so as to make the system wholly invisible, and yet provide for separate areas of circular air flow, whereby individually controlled cooling, even on a zone basis, can be obtained.

Other objects and advantages of my invention will be apparent from the following description and drawings of which:

FIG. 1 is a floor plan of one floor of a representative apartment building having two apartments or dwelling units in it;

FIG. 2 is a section taken along the line 2—2 of FIG. 1, looking in the direction of the arrow and illustrating a portion of an apartment, certain wall or duct surfaces being broken away;

FIG. 3 is a section similar to FIG. 2 taken along the line 3—3 of FIG. 1, looking in the direction of the arrows;

FIG. 4 is a section similar to FIG. 2 taken along the line 4—4 of FIG. 1, looking in the direction of the arrows;

FIG. 5 is a section through one of the condenser units taken along the line 5—5 of FIG. 1, looking in the direction of the arrows showing the parts thereof somewhat diagrammatically in elevation; and FIG. 6 is a section similar to FIG. 5 through one of the evaporator units taken substantially along the line 6—6 of FIG. 4 showing the interior parts thereof in elevation.

For convenience of reference let it be assumed that the legend FIG. 1 on that figure represents the north side of the illustrated apartment building floor. With such orientation, the access means consisting of the elevator shaft 10 and the stairs 12 occupy the northeast corner. The remaining north side of the floor and the two west rooms on the south side indicated as bedroom #1 and living room comprise one apartment. A second apartment occupies the remainder of the space. The common wall is indicated by the numeral 14. Access to the first apartment is through the kitchen door 16 and double main entrance doors 18. Access to the second apartment is through double main access doors 20 and a kitchen door 21. A ledge 22 of subtsantial width extends along the north and south walls outside the exterior or window walls 24 at the level of the apartment floor 26. On these ledges, or more desirably, on the north ledge are situated the condenser units 27 particularly illustrated in FIG. 5.

The condenser units include a motor 28 powering a compressor 30 and a fan 32. The compressor receives refrigerant through a tube 34, compresses it, circulates it through a radiator 36 over which air is blown by fan 32, and stores it in a tank 38. Refrigerant is withdrawn from the tank upon thermostatic demand (not shown) and delivered to the evaporator unit 39 shown in FIG. 6. The thermostat unloads a check valve 40 and starts a blower 42. The refrigerant under reduced pressure circulates through a radiator 44 interposed in the air stream of the blower 42.

Considering first the smaller of the two apartments, a single system is sufficient to accommodate and cool the whole area. It consists of the condenser unit 27a on the north ledge 22 and the evaporator unit 39a in the apartment. Appropriate tubing 46, shown diagrammatically, is enclosed in the walls or floors of the building to carry the refrigerant fluid between the evaporator and the condenser.

The area associated with the evaporator 39a and its related duct work occupies a wardrobe, closet, hall, and storage complex 48, roughly rectangular in form, and providing a fronting surface on the areas identified as bedroom, den and living room.

Turning to FIG. 4, a false ceiling 50 is constructed in such areas where the duct work, both delivery and return, may be situated. The false ceiling is spaced below the true ceiling 52 a short distance to leave a shallow space 54. In the area occupied by the evaporator, a deeper, downward, box-like projection 56 is provided to house the evaporator. The false ceiling 50 will be provided throughout a confined area communicating with the living areas by lintelled doorways so that the ceiling will terminate at the walls and lintels of the area, thus creating an impression, not of a false ceiling, but of a passage, closet, etc. of reduced headroom. The box-like projection 56 containing the evaporator will be situated in a wardrobe or closet to convey the impression, simply, of dead, boxed-in space at the top.

The evaporator preferably will use a squirrel cage blower because of its quietness of operation. As is well known, such blowers have axial openings 58 (FIG. 6) for air intake and a tangential orifice 60 for air discharge.

The false ceiling 50 houses both the air intake and the air discharge. It will be appreciated in FIG. 1 that the hatched area of the complex 48 is that area having the false ceiling and constitutes the air intake system. The evaporator housing is spaced well away from the blower 42 as at 62 to provide ready access of the intake openings 58 to the return air or, in other words, to the space 54. Entry of air from the living areas into the air intake system is through registers 64 adjacent the ceiling of the living areas communicating directly with the air intake space 54.

The cool air discharge system is contained within the space 54 and consists of enclosed duct work connected to the orifice 60 of the blower. Viewing the area under consideration in FIG. 1, the air discharges from the orifice 60 into an elbow 66 having vanes 68 therein to direct the air flow smoothly through a right angle. The flow continues straight through duct 70 until, as it approaches the end of the duct, a part of the air is diverted by a baffle 72 to the left and the rest is diverted by vanes 74 to the right. The vanes direct the air through a register 76 opening off the side of duct 70 out of the space 54 and into the living room, again at ceiling level. The register may be adjustably opened to control the air flow therethrough.

The part of the air diverted by the baffle 72 flows through a duct continuation 78 at right angles to duct 70. Part of this air is diverted out through a similar register 80 by a baffle 82 into the den. The rest continues ahead to another similar discharge register 84 opening into the bedroom. The duct continuation illustrated has a restriction 86 therein to help diversion through register 80. It will be appreciated that any of the three registers may be adjustably closed to control the relative quantity of air delivered to each of the three living areas.

In the area discussed here it will be appreciated that the air return from the register 64a will be blocked by the air discharge duct work from the blower unless special provision is made. Such provision is effected by using discharge ducts 70 (FIG. 4) substantially shallower than the air return space 54. The ducts may be mounted against either the true ceiling 52 as shown or against the false ceiling. A passage across the duct is thus provided between the duct and the opposite ceiling, true or false.

The situation regarding the larger apartment is very similar to that of the smaller except that this being a six-room rather than a three-room unit, two separate systems may be employed. One of these handles four rooms and the other two rooms. The system handling four rooms consists of the condenser unit 27b and the evaporator unit 39b with tubes 90 interconnecting the units for refrigerant flow.

The north side of this apartment is laid out along a hall 92 entered by the access doors 18. The areas marked den and dining room open directly onto the hall with wide span undoored openings, which however possess a lintel 94. The area marked "living room" on the south side of the hall opens in the same fashion and likewise possesses a lintel 94. The true ceiling of the hall thus being bounded everywhere either by walls or by lintels, a false ceiling 98 may be constructed beneath it to define an air return system and to house the air discharge duct work 100. A large closet 102 is provided on the south side of the hall at its west end in which the relatively deep evaporator enclosures 104 are situated. These enclosures again will be coterminous with shelves or built-in chests so as to be totally inconspicuous.

As before, the evaporator unit 39b discharges in part straight ahead through a register 106 in bedroom #2. The remainder of the flow is diverted as by vanes and a baffle similar to the parts indicated by 72 and 74 in the previously described system at right angles through the duct work 100 to extend substantially the length of the hall within the air return space 102. Some of the air is diverted as by a baffle 108 out through register 110 into the den. Thereafter the duct is partially restricted as at 112 to create a certain amount of back pressure for air discharge through the register 110 and also to maintain air velocity through the remainder of the system. Further air is similarly discharged through a register 114 into the dining room and, after a further constriction 116, the remainder of the air is discharged into the breakfast area at 118. The dining room which is in open communication with the breakfast area and the kitchen has a return air register 120. The den and bedroom #2 likewise have return air registers 122.

The other air conditioning unit associated with this apartment consists of condenser 27c and evaporator 39c and the interconnecting tubing 124. Duct work 126 and registers 128 and 130 are provided to direct air into bedroom #1 and the living room.

The closet 102 is in open communication with bedroom #1. Again, the entrance to the closet will have a lintel overhead at 128. Instead of providing the return air register in a wall surface of bedroom #1, a register 130 may be provided on the under side of the false ceiling within the closet 102 to provide for air circulation through bedroom #1.

I have described in considerable detail here three specific applications of my invention from which its general utility, application to other room arrangements and design may be readily deduced. In summary, my invention resides in the provision of an air conditioned apartment building wherein a separate system is provided for each apartment. The system is large enough to permit the use of relatively efficient and sturdy components as compared with the conventional window air conditioned which is suitable only for a room. At the same time the structural cost of a central plant is avoided. The use of the large system permits a separation of the evaporator and condenser units to provide optimum heat transfer outside the building and avoid noise, odors, etc. inside. It resides in the provision for controlled circulation of air within the apartment through the medium of a false ceiling which, in itself, provides an air return system and encloses duct work through which cooled air is discharged. With the use of the adjustable registers, flow to any room within the apartment may be closely controlled and different degrees of cooling may be obtained as between different rooms. The location of the false ceiling in hallway or closet areas makes the system substantially invisible. The deeper enclosures required for housing the evaporator unit are easily camouflaged within built-in cabinets. The false ceiling may be shallow so as to produce an almost unnoticeable reduction of ceiling height.

It will thus be understood that my invention is capable of taking many forms and of being practiced in many alternative ways. I therefore desire that my invention be regarded as being limited only as set forth in the following claims.

I claim:

1. In an apartment which is one of many in a multiple unit dwelling and which has a plurality of rooms, some of which are non-adjacent, and a corridor adjoining most of said rooms, an air conditioning system comprising a false ceiling in said corridor situated below the true ceiling thereof over an area fronting on more than one of said rooms including non-adjacent rooms, means closing the peripheral edges of said false ceiling against said true ceiling to define a closed chamber against said true ceiling, an evaporator unit in said chamber including a blower having an air intake and a discharge orifice, said intake being open to said chamber, duct work within said chamber and connected to said orifice and extending through said closing means at at least two points to open on at least two of said non-adjacent rooms, means defining openings through said closing means in said rooms for admitting air into said chamber to permit circulation of air in said rooms individually, a condenser unit outside the wall of said dwelling, and conduits interconnecting said condenser unit and said evaporator unit for conducting refrigerant fluid between said units.

2. The combination as set forth in claim 1 including additionally adjustable registers in said duct work opening.

References Cited by the Examiner
UNITED STATES PATENTS

| | | | |
|---|---|---|---|
| 2,130,157 | 9/38 | Rugg | 98—33 |
| 2,259,803 | 10/41 | Cumming | 62—419 |
| 2,277,247 | 3/42 | Morse | 62—259 |
| 2,682,757 | 7/54 | Borgerd | 62—419 |
| 2,753,157 | 7/56 | Hoyer | 165—22 |
| 2,793,508 | 5/57 | Mueller | 62—259 |
| 2,804,816 | 9/57 | Hoyer | 62—259 |
| 2,896,428 | 7/59 | Paton | 62—186 |
| 2,899,180 | 8/59 | Allander | 165—22 |
| 2,962,582 | 11/60 | Croft | 98—40 |
| 2,984,459 | 5/61 | Waterfill | 62—419 |
| 3,052,104 | 9/62 | Carini | 62—262 |

ROBERT A. O'LEARY, Primary Examiner.

WILLIAM J. WYE, Examiner.